US012615608B2

(12) United States Patent
Bertz et al.

(10) Patent No.: US 12,615,608 B2
(45) Date of Patent: *Apr. 28, 2026

(54) WIRELESS USER EQUIPMENT (UE) REGISTRATION WITH NETWORKING DATA RESPONSIVE TO EXTERNAL CONTROL

(71) Applicant: T-MOBILE INNOVATIONS LLC, Overland Park, KS (US)

(72) Inventors: Lyle T. Bertz, Lee's Summit, MO (US); Galip Murat Karabulut, Vienna, VA (US); Brian David Waters, Angel Fire, NM (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,161

(22) Filed: Jan. 2, 2024

(65) Prior Publication Data

US 2024/0137890 A1 Apr. 25, 2024

Related U.S. Application Data

(63) Continuation of application No. 17/225,332, filed on Apr. 8, 2021, now Pat. No. 11,882,538.

(51) Int. Cl.
| | |
|---|---|
| *H04W 60/00* | (2009.01) |
| *H04W 60/04* | (2009.01) |
| *H04W 88/06* | (2009.01) |

(52) U.S. Cl.
CPC ......... *H04W 60/005* (2013.01); *H04W 60/04* (2013.01); *H04W 88/06* (2013.01)

(58) Field of Classification Search
CPC ... H04W 60/00; H04W 60/005; H04W 88/06; H04W 60/04
See application file for complete search history.

(56) References Cited

U.S. PATENT DOCUMENTS

| | | | | |
|---|---|---|---|---|
| 7,051,096 | B1 * | 5/2006 | Krawiec | G07F 19/206 |
| | | | | 235/379 |
| 9,344,933 | B1 | 5/2016 | Velusamy et al. | |
| 9,622,206 | B1 | 4/2017 | Malhotra et al. | |
| 9,949,198 | B2 | 4/2018 | Malhotra et al. | |
| 10,299,128 | B1 | 5/2019 | Suthar et al. | |
| 10,299,184 | B1 | 5/2019 | Malhotra et al. | |
| 10,531,420 | B2 | 1/2020 | Li et al. | |
| 10,687,300 | B2 | 6/2020 | Youn et al. | |
| 10,856,131 | B2 | 12/2020 | Ryu et al. | |
| 10,856,265 | B2 | 12/2020 | Ryu | |
| 11,882,538 | B1 * | 1/2024 | Bertz | H04W 60/04 |
| 2018/0192390 | A1 * | 7/2018 | Li | H04W 16/04 |

(Continued)

*Primary Examiner* — Jinsong Hu
*Assistant Examiner* — Farideh Madani

(57) ABSTRACT

A wireless communication system receives a registration cause for a User Equipment (UE) from a user data system. The wireless communication system generates a network message that indicates the registration cause for the UE. The wireless communication system transfers the network message that indicates the registration cause to the UE. The wireless communication system receives a registration request from the UE that indicates the registration cause. In response, the wireless communication system registers the UE to use the wireless communication system based on the registration cause.

20 Claims, 10 Drawing Sheets

(56)     References Cited

U.S. PATENT DOCUMENTS

| 2018/0270778 | A1 | | 9/2018 | Bharatia | |
| 2019/0342851 | A1 | | 11/2019 | Shan et al. | |
| 2021/0235266 | A1 | * | 7/2021 | Starsinic | H04W 8/205 |
| 2022/0015174 | A1 | * | 1/2022 | Aramoto | H04W 76/18 |

* cited by examiner

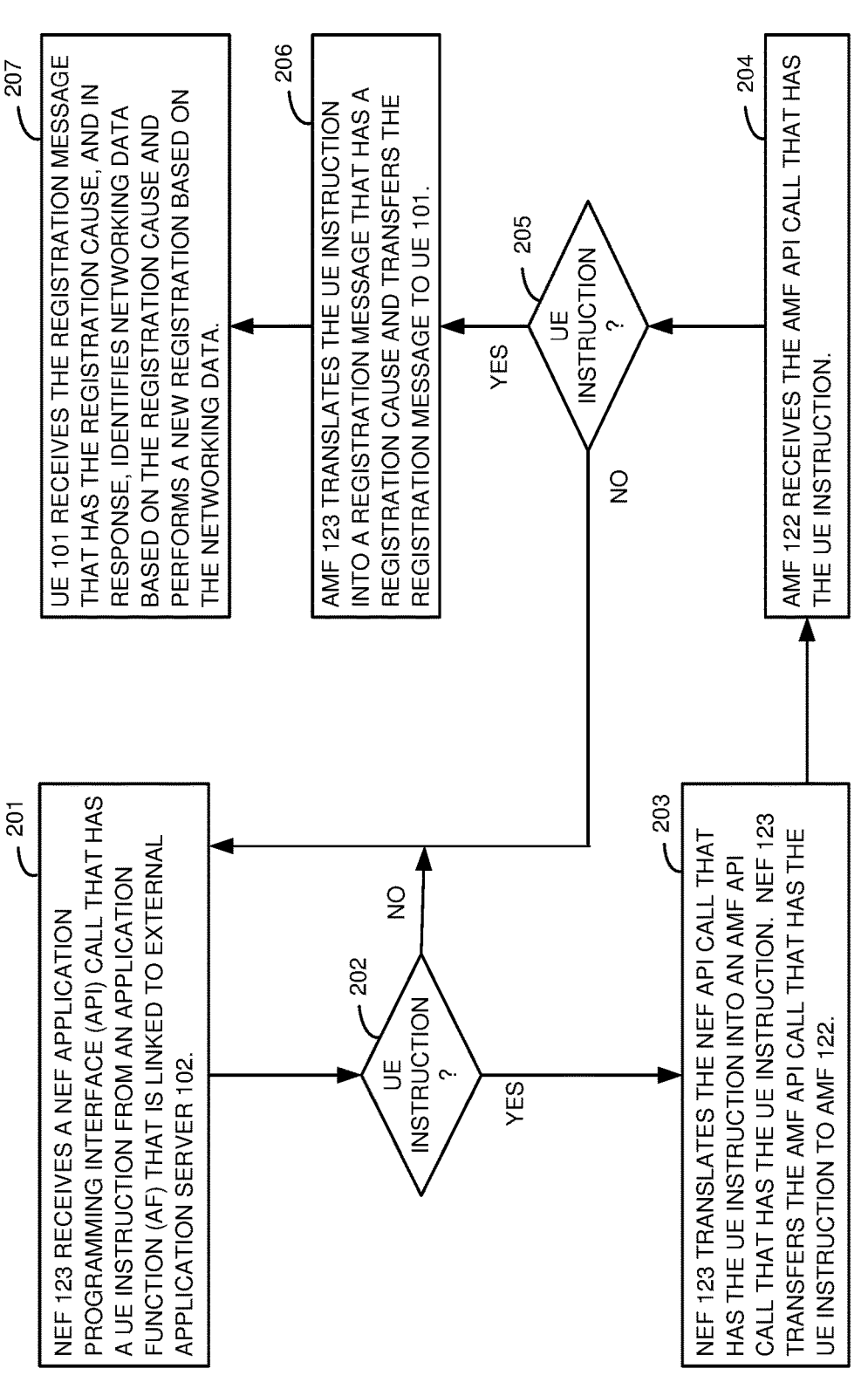

201 NEF 123 RECEIVES A NEF APPLICATION PROGRAMMING INTERFACE (API) CALL THAT HAS A UE INSTRUCTION FROM AN APPLICATION FUNCTION (AF) THAT IS LINKED TO EXTERNAL APPLICATION SERVER 102.

202 UE INSTRUCTION ? NO / YES

203 NEF 123 TRANSLATES THE NEF API CALL THAT HAS THE UE INSTRUCTION INTO AN AMF API CALL THAT HAS THE UE INSTRUCTION. NEF 123 TRANSFERS THE AMF API CALL THAT HAS THE UE INSTRUCTION TO AMF 122.

204 AMF 122 RECEIVES THE AMF API CALL THAT HAS THE UE INSTRUCTION.

205 UE INSTRUCTION ? YES / NO

206 AMF 123 TRANSLATES THE UE INSTRUCTION INTO A REGISTRATION MESSAGE THAT HAS A REGISTRATION CAUSE AND TRANSFERS THE REGISTRATION MESSAGE TO UE 101.

207 UE 101 RECEIVES THE REGISTRATION MESSAGE THAT HAS THE REGISTRATION CAUSE, AND IN RESPONSE, IDENTIFIES NETWORKING DATA BASED ON THE REGISTRATION CAUSE AND PERFORMS A NEW REGISTRATION BASED ON THE NETWORKING DATA.

FIGURE 2

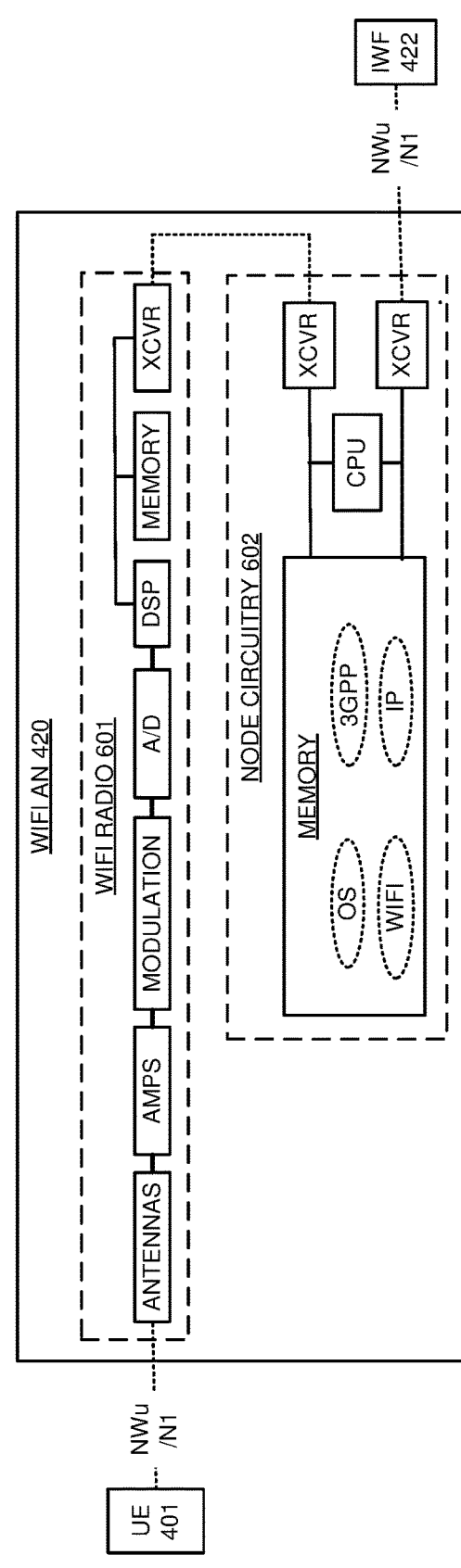
FIGURE 6

400

WIRELESS NETWORK CORE 800

VNFS 805

IWF 822    NEF 824    SMF 826

AMF 823    AF 825    UPF 827

NFVI VIRTUAL LAYER 804 vNIC    vCPU    vRAM    vDRIVE    vSW

NFVI OPERATING SYSTEMS 803

KERNEL    MODULE    APPLICATION    CONTAINER    HYPERVISOR

NFVI HARDWARE DRIVERS 802

NIC    CPU    RAM    DRIVE    SW

NFVI HARDWARE 801

NIC    CPU    RAM    DRIVE    SW

N6

N2/N1

NWu/N1

5GNR AN 421

WIFI AN 420

WIRELESS USER EQUIPMENT (UE) REGISTRATION WITH NETWORKING DATA RESPONSIVE TO EXTERNAL CONTROL

RELATED CASES

This United States Patent Application is a continuation of U.S. patent application Ser. No. 17/225,332 that was filed on Apr. 8, 2021 and is entitled "WIRELESS USER EQUIP-MENT (UE) REGISTRATION WITH NETWORKING DATA RESPONSIVE TO EXTERNAL CONTROL." U.S. patent application Ser. No. 17/225,332 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), Interworking functions (IWFs), User Plane Functions (UPFs), Network Exposure Functions (NEFs), Application Functions (AFs), and the like. The wireless communication networks may comprise Public Land Mobile Networks (PLMNs) that use different wireless access technologies and different radio frequency bands. The wireless network elements are grouped into different Dynamic Network Names (DNNs) and wireless network slices.

A wireless user device initially registers with a network controller like an Access and Mobility Management Function (AMF) over a wireless access node. The wireless user device and the network controller exchange data to authenticate the identity of the wireless user device and to identify qualified services for the wireless user device. The network controller selects parameters like frequency band, access node, DNN, slice, and the like for the qualified services. The wireless user device may also select or request parameters like frequency band, access node, PLMN, slice, and the like. In some cases, the network controller directs the wireless user device to deregister and reregister on a new frequency band. The network controller may direct the wireless user device to handover to a new access node that will require a new registration. The network controller may direct the wireless user device to re-authenticate which requires a new registration. Unfortunately, the network controller does not effectively direct registrations based on external control from a user application server. Moreover, the network controller does not efficiently direct registrations to inject new networking data like a new PLMN, DNN, or slice in response to the external application server.

TECHNICAL OVERVIEW

In some examples, a registration cause for a User Equipment (UE) is received from a user data system. A network message that indicates the registration cause for the UE is generated. The network message that indicates the registration cause is transferred to the UE. A registration request is received from the UE that indicates the registration cause. In response, the UE is registered to use a wireless communication network based on the registration cause.

In some examples, a wireless network slice request is received for the UE from a user data system. A network message is generated for the UE having registration information that indicates the wireless network slice. The network message is transferred that has the registration information indicating the wireless network slice to the UE. The registration information is received indicating the wireless network slice from the UE, and in response, the UE is registered to use the wireless network slice based on the registration information.

In some examples, a wireless communication system registers a User Equipment (UE). The wireless communication system comprises a Network Exposure Function (NEF) to receive a wireless network slice request for the UE from a user data system. The wireless communication system comprises an Access and Mobility Management Function (AMF) to generate a network message for the UE that has registration information that indicates the wireless network slice. The AMF is to transfer the network message that has the registration information that indicates the wireless network slice to the UE. The AMF is to receive the registration information that indicates the wireless network slice from the UE, and in response, register the UE to use the wireless network slice based on the registration information.

DESCRIPTION OF THE DRAWINGS

FIG. 2 illustrates an exemplary operation of the wireless communication network that has the NEF and the AMF to register the UE.

FIG. 6 illustrates the WIFI access node in the 5G wireless communication network.

DETAILED DESCRIPTION

Figure 1:
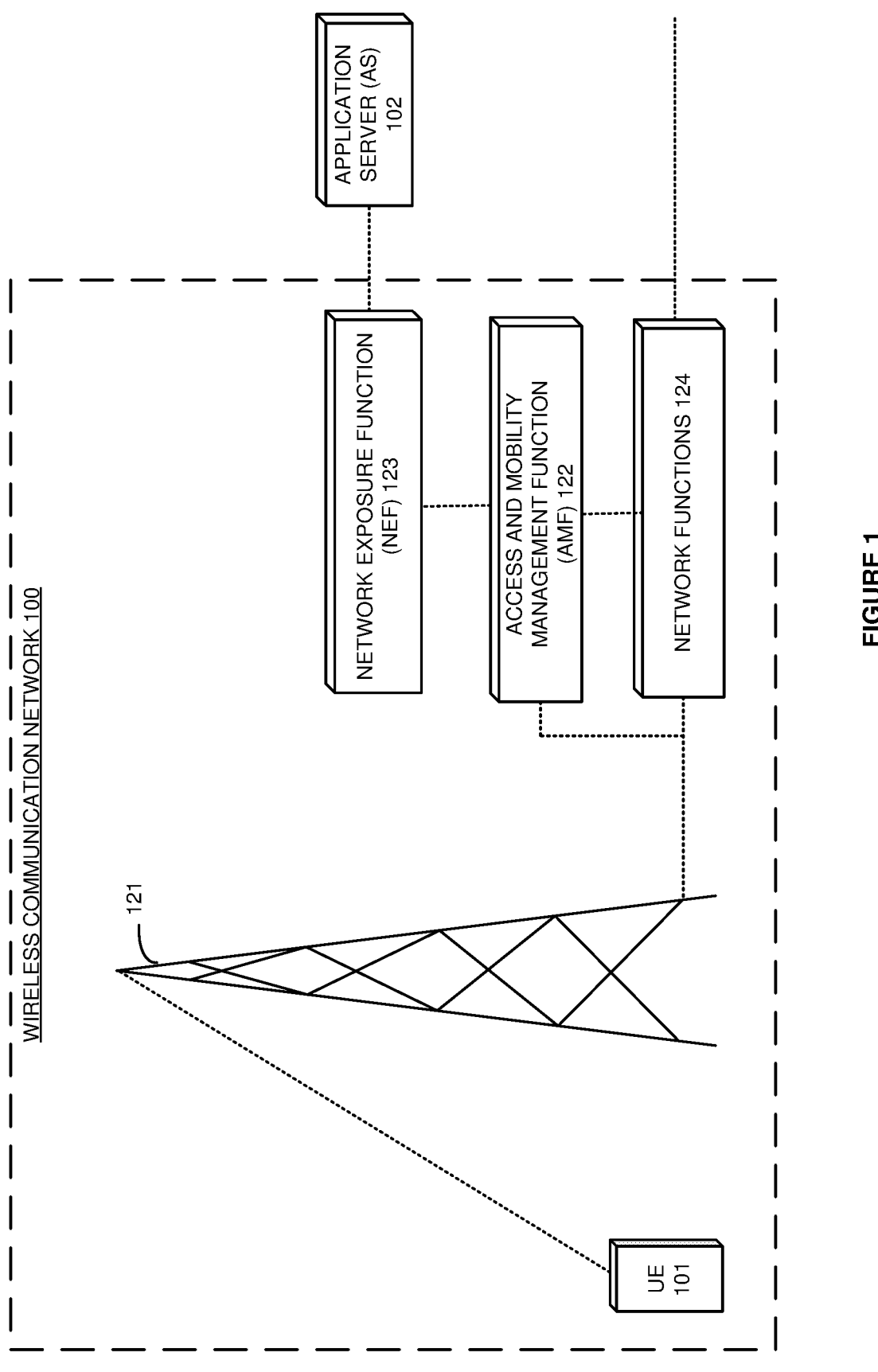
FIG. 1 illustrates a wireless communication network that has a Network Exposure Function (NEF) and an Access and Mobility Management Function (AMF) to register a User Equipment (UE).

FIG. 1 illustrates wireless communication network 100 that has Network Exposure Function (NEF) 123 and Access and Mobility Management Function (AMF) 122 to register User Equipment (UE) 101. UE 101 comprises a computer, phone, vehicle, sensor, robot, or some other data appliance with communication circuitry. Wireless communication network 100 delivers services to UE 101 like internet-access, machine-control, media-streaming, or some other data communications product. Wireless communication network 100 comprises UE 101, Radio Access Network (RAN) 121, AMF 122, NEF 123, and network functions 124.

Various examples of network operation and configuration are described herein. In some examples, NEF 123 receives a NEF Application Programming Interface (API) call that has a UE instruction. The NEF API call may come from an Application Function (AF) that is controlled by Application Server (AS) 102. NEF 123 translates the NEF API call that has the UE instruction into an AMF API call that has the UE instruction. NEF 123 transfers the AMF API call that has the UE instruction to AMF 122. AMF 122 translates the UE instruction into a registration message that has a registration cause. AMF 122 transfers the registration message that has the registration cause to UE 101 over RAN 121 or another access network. In response to the registration message, UE 101 identifies networking data based on the registration cause and performs a new registration based on the networking data over RAN 121 or the other access network.

In some examples, the UE instruction requests a UE ID authentication for UE 101, and the registration cause indicates an immediate AMF re-registration to re-authenticate the UE ID in UE 101. In response to the registration cause, UE 101 and AMF 122 perform a new AMF registration to authenticate the UE ID in UE 101. In some examples, the UE instruction requests a new AMF, wireless network slice, and/or Dynamic Network Name (DNN) for UE 101. The registration cause indicates the new AMF, slice, and/or DNN to use in an AMF re-registration. In response to the registration cause, UE 101 and AMF 122 or a new AMF perform a new registration to use the new AMF, slice, and/or DNN for UE 101. In some examples, the UE instruction requests a new frequency band, access node, Public Land Mobile Network (PLMN), and/or reboot procedure for UE 101. The registration cause indicates the new frequency band, access node, PLMN, and/or reboot procedure to use in a RAN re-registration. In response to the registration cause, UE 101 and RAN 121 or the other access network perform a new access network registration to use the new frequency band, access node, PLMN, and/or reboot procedure for UE 101.

Advantageously, AMF 122 and NEF 123 effectively direct UE registrations based on external control from AS 102. Moreover, AMF 122 and NEF 123 efficiently direct the UE registrations to inject new networking data like a new PLMN, DNN, or slice in response to the external control from AS 102.

UE 101 communicates with RAN 121 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, Narrowband Internet-of-Things (NB-IoT), and/or some other wireless networking protocol. The wireless communication technologies use electromagnetic frequencies in the low-band, mid-band, high-band, or some other portion of the electromagnetic spectrum. The communication links that interconnect wireless communication network 100 use metallic links, glass fibers, radio channels, or some other communication media. The communication links use IEEE 802.3 (ENET), Internet Protocol (IP), Time Division Multiplex (TDM), Data Over Cable System Interface Specification (DOCSIS), General Packet Radio Service Transfer Protocol (GTP), 3GPP, 5GNR, LTE, WIFI, virtual switching, inter-processor communication, bus interfaces, and/or some other data communication protocols. UE 101 communicates with AMF 122 and network functions 124 over RAN 121. UE 101 may also communicate with AMF 122 and network functions 124 over wireline access networks like Internet Service Providers (ISPs).

UE 101 and RAN 121 comprise antennas, amplifiers, filters, modulation, analog/digital interfaces, microprocessors, software, memories, transceivers, bus circuitry, and the like. AMF 122, NEF 123, and network functions 124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

FIG. 2 illustrates an exemplary operation of wireless communication network 100 that has NEF 123 and AMF 122 to register UE 101. This operation is exemplary and may vary in other examples. NEF 123 receives a NEF Application Programming Interface (API) call that has a UE instruction (201). NEF 123 detects the UE instruction (202), and in response, NEF 123 translates the NEF API call that has the UE instruction into an AMF API call that has the UE instruction (203). NEF 123 transfers the AMF API call that has the UE instruction to AMF 122 (203). AMF 122 receives the AMF API call that has the UE instruction (204). AMF 122 detects the UE instruction (205), and in response, AMF 122 translates the UE instruction into a registration message that has a registration cause (206). AMF 122 transfers the registration message that has the registration cause to UE 101 (206). UE 101 receives the registration message that has the registration cause, and in response, UE 101 identifies networking data based on the registration cause (207). UE 101 performs a new registration based on the networking data over RAN 121 or another access network (207).

Figure 3:
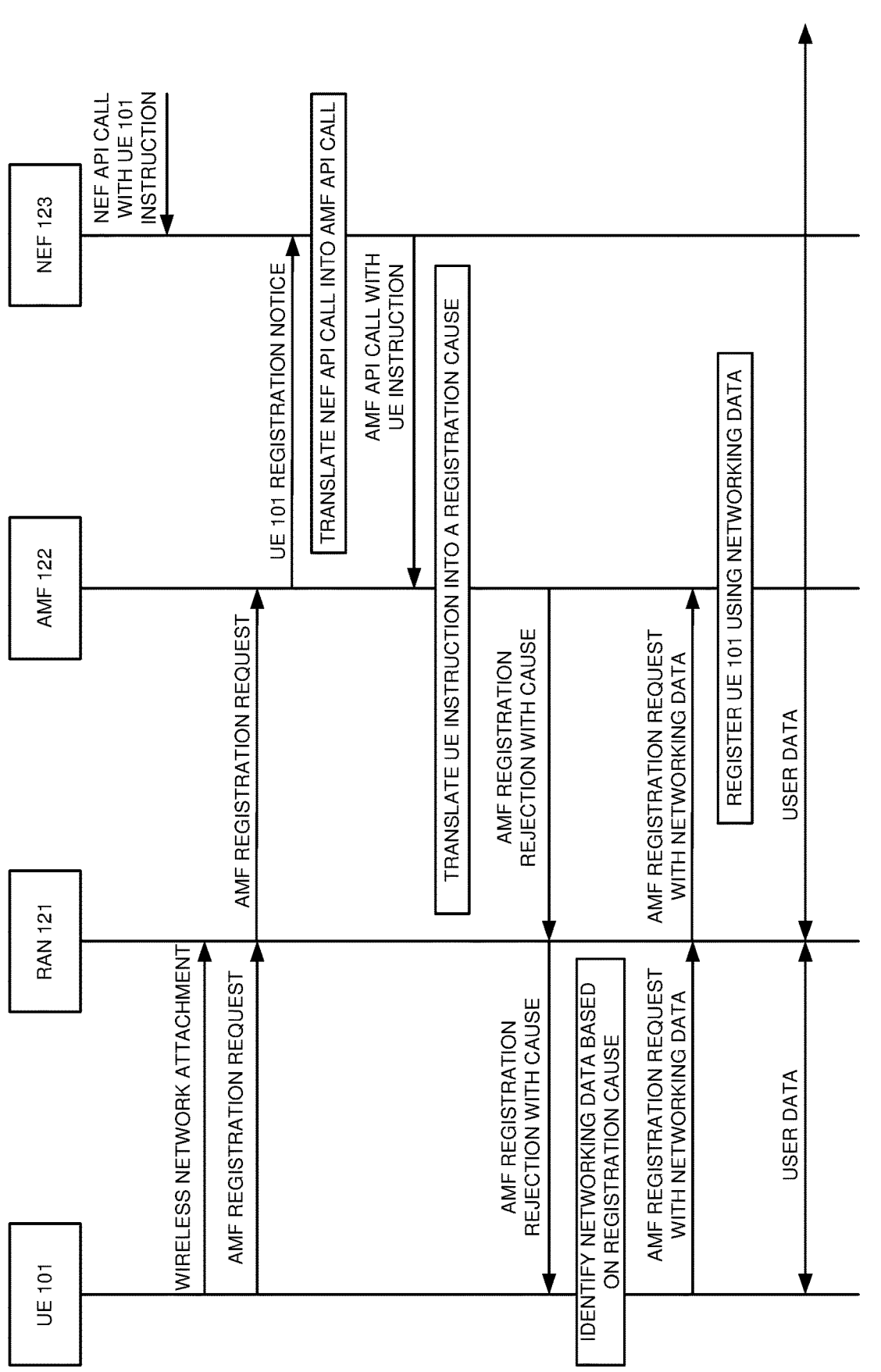
FIG. 3 illustrates an exemplary operation of the wireless communication network that has the NEF and the AMF to register the UE.

FIG. 3 illustrates an exemplary operation of wireless communication network 100 that has NEF 123 and AMF 122 to register UE 101. This operation is exemplary and may vary in other examples. NEF 123 receives a NEF API call that has an instruction for UE 101. UE 101 wirelessly attaches to RAN 121 and transfers an AMF registration request to AMF 122 over RAN 121. In response to a previous NEF event subscription for UE 101, AMF 122 transfers a registration notice for UE 101 to NEF 123. In response to the NEF API call and the registration notice for UE 101, NEF 123 translates the NEF API call that has the UE instruction into an AMF API call that has the UE instruction. NEF 123 transfers the AMF API call that has the UE instruction to AMF 122. AMF 122 translates the UE instruction into a registration rejection that has a registration cause. The registration cause comprises coded instructions to re-register with new networking data at a future time or in response to a future condition. AMF 122 transfers an AMF registration rejection that has the registration cause to UE 101 over RAN 121. In response to the registration message, UE 101 identifies networking data and the future time or condition. UE 101 transfers another AMF registration request to AMF 122 over RAN 121 using the network data in response to the occurrence of the future time or condition. AMF 122 performs the AMF registration based on the networking data. The networking data could drive AMF 122 to use a new slice, DNN, quality, or the like for UE 101. UE 101 and RAN 121 exchange user data under the direction of AMF 122. RAN 121 exchanges the user data with network functions 124 under the direction of AMF 122.

Figure 4:
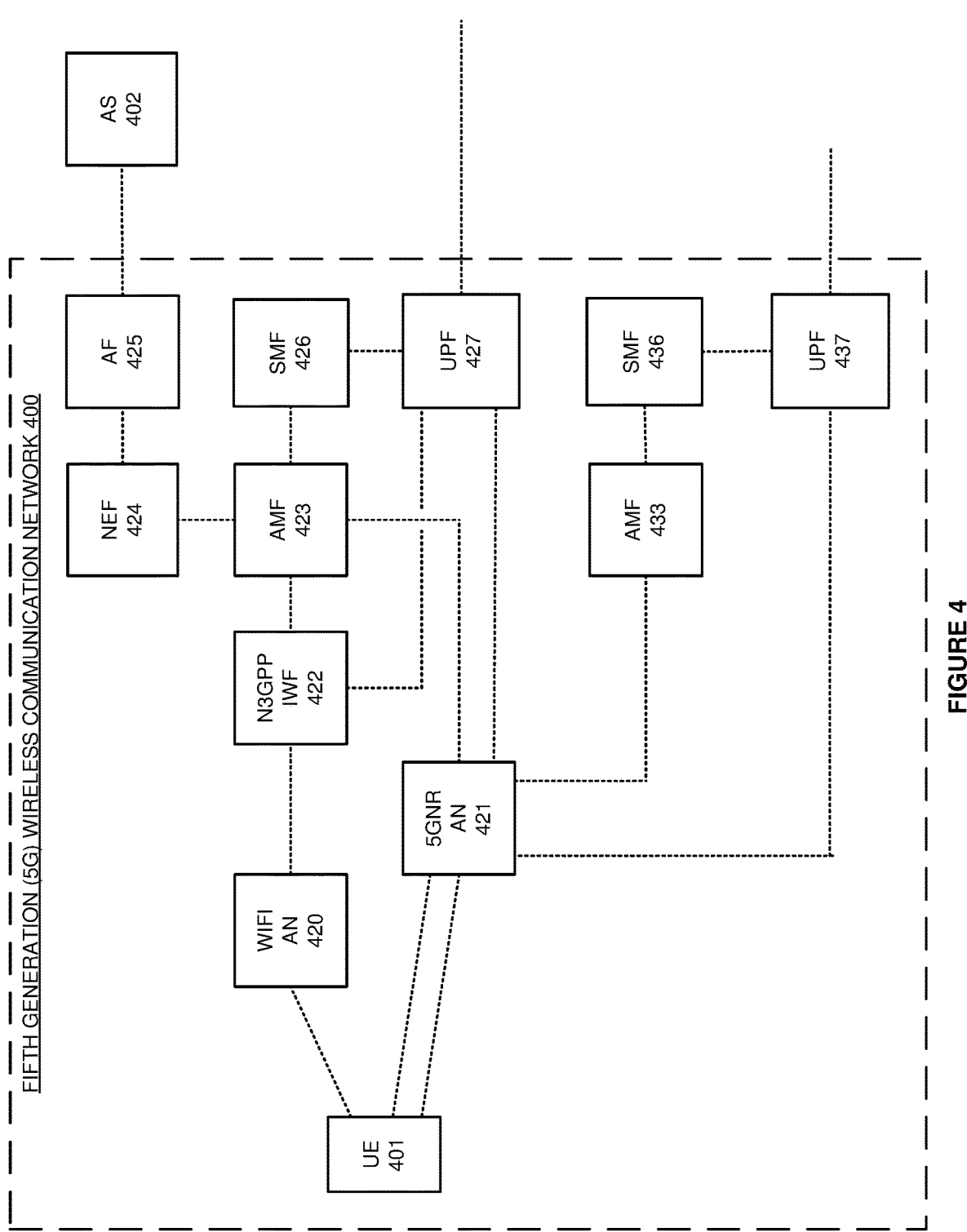
FIG. 4 illustrates a Fifth Generation (5G) wireless communication network that has a NEF and AMF to register a UE.

FIG. 4 illustrates Fifth Generation (5G) wireless communication network 400 that has NEF 424 and AMF 423 to register UE 401. 5G wireless communication network 400 comprises an example of wireless communication network 100, although network 100 may vary from this example. 5G wireless communication network 400 comprises UE 401, WIFI AN 420, 5GNR AN 421, Non-Third Generation Partnership Project (N3GPP) IWF 422, Access and Mobility Management Function (AMF) 423, Network Exposure Function (NEF) 424, Application Function (AF) 425, Session Management Function (SMF) 426, User Plane Function (UPF) 427, AMF 433, SMF 436, and UPF 437.

AS 402 transfers an instruction for UE 101 to AF 425. The user instruction may indicate when the user instruction should be implemented—immediately, a future time, or in response to a future event. For example, UE 401 may be a carbon dioxide sensor, and the instruction could be to re-register when the carbon dioxide level exceeds a reporting threshold. The user instruction may indicate a registration technique—after UE reboot, RAN registration, new access network registration, AMF registration, or new AMF registration, and the like. For example, UE 401 may reboot an operating system and then re-register with new AMF 433. The user instruction may indicate new registration data for PLMN, frequency band, access node, AMF, slice, DNN, and the like. For example, UE 401 may deregister and go dormant until late-night, and then register with new PLMN for a content download. AF 425 translates the user instruction from AS 402 into a northbound API call. AF 425 transfers northbound API call to NEF 424.

NEF 424 translates the NEF API call that has the UE instruction into an AMF API call that has the UE instruction. The translation may entail the abstraction of network data. In some cases, NEF 424 awaits a time or other condition like UE registration to generate the AMF API call. Eventually, NEF 424 transfers the AMF API call that has the UE instruction to AMF 423. AMF 423 translates the UE instruction into a registration message that has a registration cause. For example, AMF 423 may map registration instructions for time, condition, technique, and networking data into alpha-numeric codes that are added to an existing cause and that are understood by UE 401. AMF 423 transfers the registration message with the registration cause to UE 401 over ANs 420-421.

In response to the registration message, UE 401 identifies networking data based on the registration cause. For example, UE 401 may host a data structure that translates alpha-numeric codes into registration instructions. UE 401 identifies how and when to perform the new registration based on the registration cause. UE 401 performs the specified type of registration based at the appropriate time using the select networking data. For example, UE 401 may register with 5GNR AN 421 to use a new PLMN and/or new AMF 433. UE 401 may register with AMF 423 to use a new slice and/or DNN. UE 401 may reboot hardware and/or software before registering with ANs 421 or 422 with AMFs 423 or 433. AS 402 drives various operations over 5G wireless communication network 400. AS 402 can specify a new registration to change frequency bands, access nodes, PLMNs, AMFs, DNNs, slices, and the like. For example, AS

402 may drive 5G network 400 to de-register UE 401 from AMF 423 and its current DNN and to re-register UE 401 with AMF 433 and a new DNN.

Figure 5:
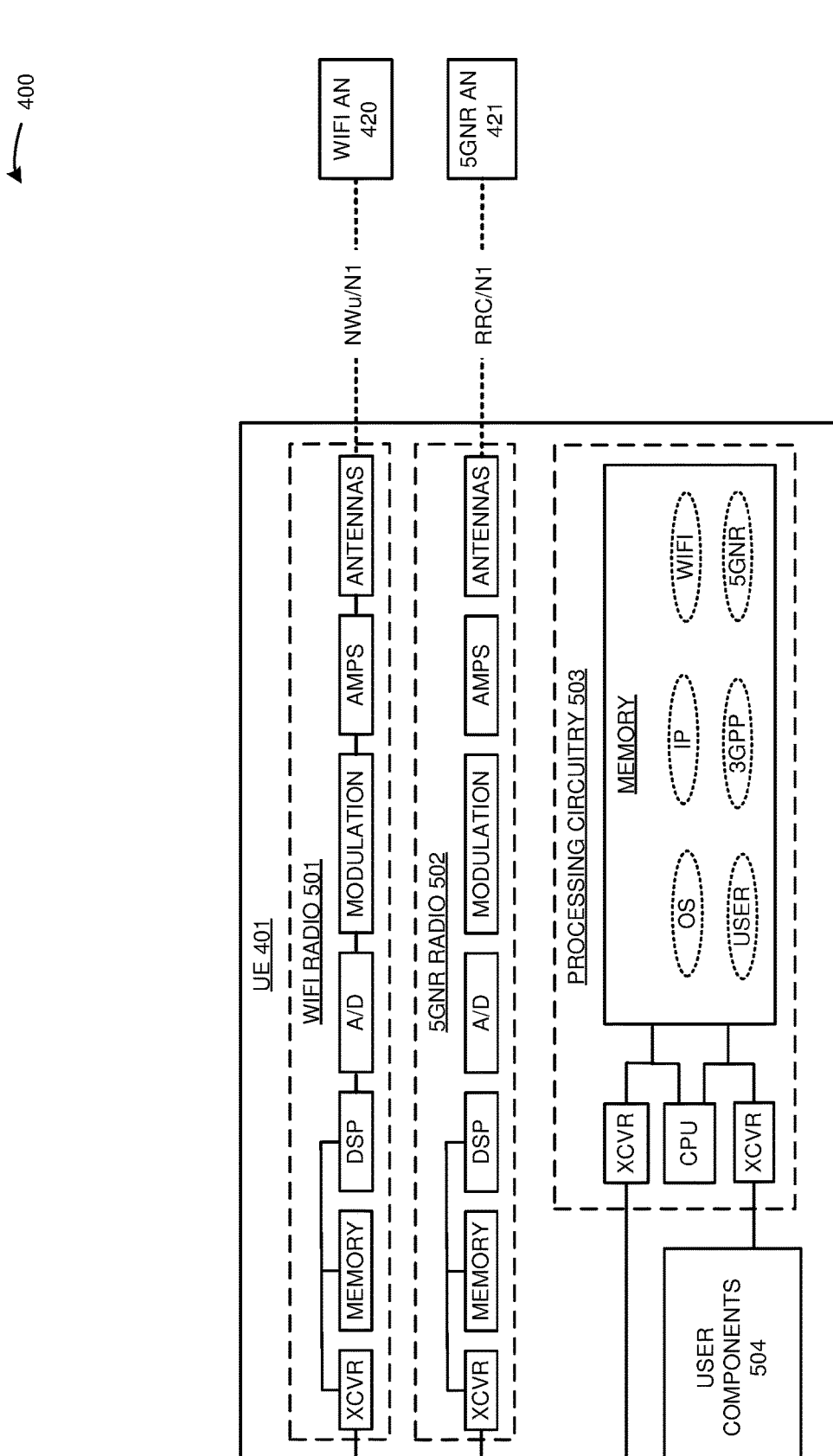
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises WIFI radio 501, 5GNR radio 502, processing circuitry 503, and user components 504. Radios 501-502 comprise antennas, amplifiers, filters, modulation, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, 3GPP, WIFI, and 5GNR. The network applications include physical layer, media access control, link control, convergence and adaption, radio resource control, and the like. The antennas in WIFI radio 501 are wirelessly coupled to WIFI AN 420 over a WIFI link that supports NWu and N1. The antennas in 5GNR radio 502 are wirelessly coupled to 5GNR AN 421 over a 5GNR link that supports RRC and N1. Transceivers (XCVRs) in radios 501-502 are coupled to transceivers in processing circuitry 503. Transceivers in processing circuitry 503 are coupled to user components 504 like displays, controllers, and memory. The CPU in processing circuitry 503 executes the operating system, user applications, and network applications to exchange network signaling and user data with respective ANs 420-421 over respective radios 501-502.

FIG. 6 illustrates WIFI AN 420 in 5G wireless communication network 400. WIFI AN 420 comprises an example of RAN 121, although RAN 121 may differ. WIFI AN 420 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, and transceivers that are coupled over bus circuitry. The memory in node circuitry 602 stores operating systems and network applications for IP, WIFI, and 3GPP like physical layer, media access control, link control, and the like. The antennas in WIFI radio 601 are wirelessly coupled to UE 401 over wireless links that support NWu and N1. Transceivers in WIFI radio 601 are coupled to transceivers in node circuitry 602, and transceivers in node circuitry 602 are coupled to transceivers in IWF 422 over links that support NWu and N1. The CPU in node circuitry 602 executes the operating system and network applications to exchange data and signaling with UE 401 and to exchange data and signaling with IWF 422.

Figure 7:
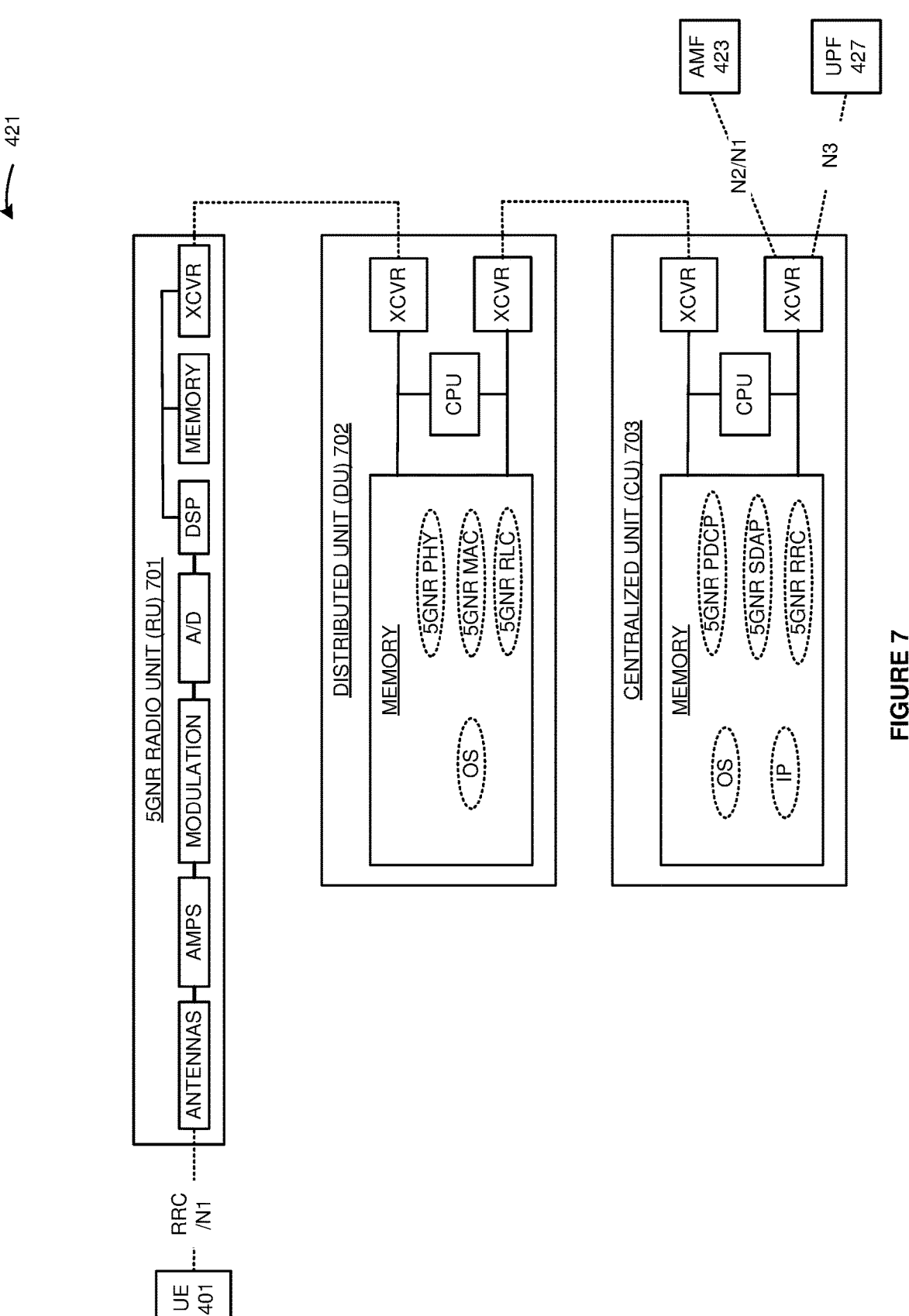
FIG. 7 illustrates the LTE access node in the 5G wireless communication network.

FIG. 7 illustrates 5GNR AN 421 in 5G wireless communication network 400. 5GNR AN 421 comprises an example of RAN 121, although RAN 121 may differ. 5GNR AN 421 comprises 5GNR Radio Unit (RU) 701, 3GPP Distributed Unit (DU) 702, and 3GPP Centralized Unit (CU) 703. 5GNR RU 701 comprises antennas, amplifiers, filters, modulation, analog-to-digital interfaces, DSP, memory, and transceivers that are coupled over bus circuitry. DU 702 comprises memory, CPU, and transceivers that are coupled over bus circuitry. The memory in DU 702 stores operating systems and 5GNR network applications that include Physical Layer (PHY), Media Access Control (MAC), Radio Link Control (RLC), and the like. CU 703 comprises memory, CPU, and transceivers that are coupled over bus circuitry. The memory in CU 703 stores an operating system and network applications for IP and 5GNR that include Packet Data Convergence Protocol (PDCP), Service Data Adaption Protocol (SDAP), Radio Resource Control (RRC), and the like. The antennas in RU 701 are wirelessly coupled to UE 401 over 5GNR links that use various frequency bands and that support RRC and N1. Transceivers in RU 701 are coupled to transceivers in DU 702 over fronthaul links like enhanced Common Public Radio Interface (eCPRI). Transceivers in DU 702 coupled to transceivers in CU 703 over mid-haul links. Transceivers in CU 703 are coupled to AMF 423 and UPF 427 over backhaul links. The CPU in DU 703 executes an operating system and network applications to exchange 5GNR data units with RU 701 and to exchange 5GNR data units with CU 703. The CPU in CU 703 executes an operating system and network applications to exchange the 5GNR data units with DU 702, exchange N2/N1 signaling with AMF 423, and exchange N3 data with UPF 427.

Figure 8:
FIG. 8 illustrates a wireless network core in the 5G wireless communication network.

FIG. 8 illustrates wireless network core 800 in 5G wireless communication network 400. Network core 800 comprises an example of AMF 122, NEF 123, and network functions 124, although AMF 122, NEF 123, and functions 124 may differ. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise Non-3GPP Interworking Function (IWF) 822, Access and Mobility Management Function (AMF) 823, Network Exposure Function (NEF) 824, Application Function (AF) 825, Session Management Function (SMF) 826, and User Plane Function (UPF) 827. Other VNFs like Authentication Server Function (AUSF) and Network Repository Function (NRF) are typically present but are omitted for clarity. Network core 800 may be located at a single site or be distributed across multiple geographic locations. The NIC in NFVI hardware 801 are coupled to ANs 420-421 over data links that support NWu, N2, and N1. The NIC in NFVI hardware 801 are coupled to external data systems over data links that support N6. NFVI hardware 801 executes NFVI hardware drivers 802, NFVI operating systems 803, NFVI virtual layer 804, and NFVI VNFs 805 to form and operate IWF 422, AMF 423, NEF 424, AF 825, SMF 826, and UPF 827.

Figure 9:
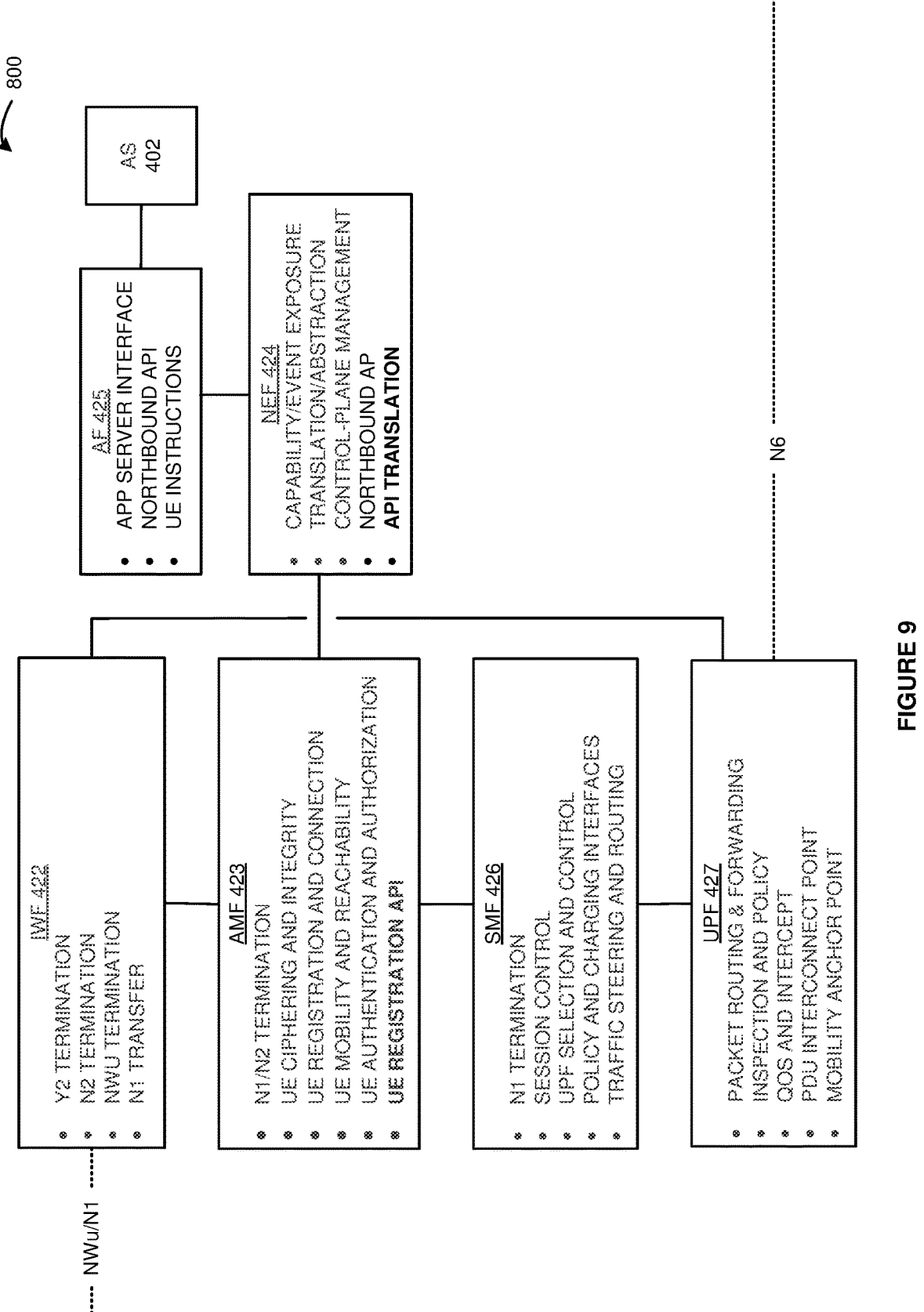
FIG. 9 further illustrates the wireless network core in the 5G wireless communication network.

FIG. 9 further illustrates wireless network core 800 in 5G wireless communication network 400. IWF 422 performs Y2 termination, N2 termination, NWu termination, and N1 transfer. AM 1423 performs N1 termination, N2 termination, UE ciphering & integrity protection UE registration and connection UE mobility and reachability, UE authentication and authorization, and serves the UE registration API to NEF 423. NEF 424 performs capability and event exposure, data translation/abstraction, control-plane management, AF interaction over the northbound API, and API translations for UE registrations initiated by AS 402. AF 425 interacts with AS 402 and NEF 424 over the northbound API. SMF 426 performs N1 termination, session establishment/management, selection and control, policy and charging control, and traffic steering and routing. UPF 427 performs packet routing & forwarding, packet inspection and policy, QoS handling and lawful intercept, PDU interconnection, and mobility anchoring.

In operation, AS 402 transfers a user instruction for UE 401 to AF 425. The user instruction indicates a registration technique, registration timing, and networking data. AF 425 translates the user instruction from AS 402 into a northbound API call. AF 425 transfers northbound API call to NEF 424. NEF 424 translates the NEF API call that has the UE instruction into an AMF API call that has the UE instruction. In some cases, NEF 424 awaits a time or other condition like UE registration to generate the AMF API call. NEF 424 transfers the AMF API call that has the UE instruction to AMF 423. AMF 423 translates the UE instruction into a registration message that has a registration cause. AMF 423 transfers the registration message with the registration cause to UE 401 over an N1 link AMF 423 may re-register UE 401 to re-authenticate, reboot, change bands, change PLMNs, change slices, change DNNs, or perform another task during re-registration.

Figure 10:
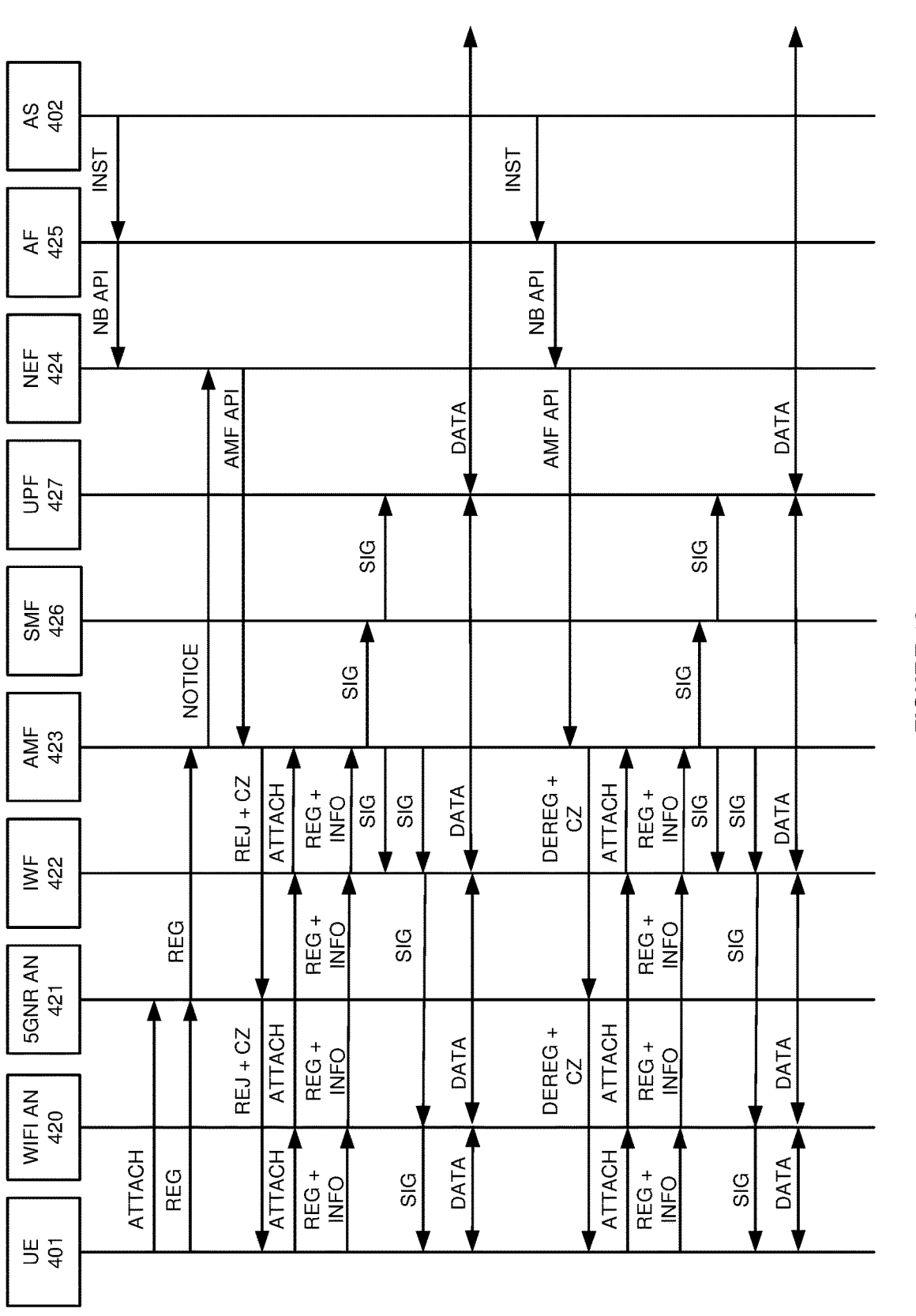
FIG. 10 illustrates an exemplary operation of the 5G wireless communication network to register the UE.

FIG. 10 illustrates an exemplary operation of 5G wireless communication network 400 to register UE 401. The operation may vary in other examples. AS 402 transfers an instruction (INST) for UE 101 to AF 425. The user instruction indicates rules for a new registration by UE 101 to use a different PLMN upon UE attachment. AF 425 translates the user instruction from AS 402 into a northbound (NB) API call. AF 425 transfers northbound API call to NEF 424.

UE 401 wirelessly attaches to 5GNR AN 421. UE 401 registers with AMF 423 over 5GNR AN 421. In response to an event subscription for UE 401, AMF 423 transfer a registration notice for UE 401 to NEF 424. In response to the northbound API call and the registration notice, NEF 424 translates the NEF API call with the UE instruction into an AMF API call with the UE instruction. NEF 424 transfers the AMF API call that has the UE instruction to AMF 423. AMF 423 translates the UE instruction into a registration rejection (REJ) that has a registration cause (CZ). AMF 423 transfers the registration rejection with the registration cause to UE 401 over 5GNR AN 421.

In response to the registration rejection, UE 401 identifies networking data based on the registration cause. In this example, the registration cause comprises an encoded instruction for UE 401 to immediately attach to WIFI AN 420 and register with AMF 423 over a different PLMN. UE 401 attaches to WIFI AN 421 and then to IWF 422. UE 401 registers (REG) with AMF 423 over WIFI AN 421 and IWF 422 and requests the different PLMN (INFO). AMF 423 selects and transfers signaling (SIG) to SMF 426 to serve UE 401 over the different PLMN. SMF 426 selects and transfers signaling to UPF 427 to serve UE 401 over the different PLMN. AMF 423 transfers signaling to IWF 422 to serve UE 401 over the different PLMN. AMF 423 transfers signaling to UE 401 over IWF 422 and AN 420 to use the different PLMN. UE 401 and WIFI AN 420 wirelessly exchange user data responsive to the signaling. WIFI AN 420 and IWF 422 exchange the user data responsive to the signaling. IWF 422 and UPF 427 exchange the user data responsive to the signaling. UPF 427 and an external system exchange the user data responsive to the signaling.

AS 402 transfers a user instruction for UE 101 to AF 425. The user instruction indicates rules for another registration by UE 401 to use a different wireless network slice at a future time. AF 425 translates the user instruction from AS 402 into northbound API call and transfers the northbound API call to NEF 424. NEF 424 translates the northbound API call with the user instruction into an AMF API call with a UE instruction. NEF 424 transfers the AMF API call that has the UE instruction to AMF 423. AMF 423 translates the other UE instruction into a deregistration instruction (DEREG) that has a cause (CZ). AMF 423 transfers the deregistration instruction with the cause to UE 401 over IWF 422 and WIFI AN 420.

In response to the deregistration instruction, UE 401 identifies networking data based on the cause. In this example, the cause comprises an encoded instruction for UE 401 to re-register with AMF 423 at a future time and request a different wireless network slice. Subsequently, UE 401 attaches to WIFI AN 421 and IWF 422. UE 401 registers with AMF 423 over WIFI AN 421 and IWF 422 at the future time and requests the different wireless network slice. AMF 423 transfers signaling to SMF 426 to serve UE 401 over the different wireless network slice. SMF 426 transfers signaling to UPF 427 to serve UE 401 over the different wireless network slice. AMF 423 transfers signaling to IWF 422 to serve UE 401 over the wireless network slice. AMF 423 transfers signaling to UE 401 over IWF 422 and AN 420 to use the wireless network slice. UE 401 and WIFI AN 420 wirelessly exchange user data responsive to the signaling. WIFI AN 420 and IWF 422 exchange the user data responsive to the signaling. IWF 422 and UPF 427 exchange the user data responsive to the signaling. UPF 427 and an external system exchange the user data responsive to the signaling.

The wireless data network circuitry described above comprises computer hardware and software that form special-purpose network circuitry to register UEs using new networking data responsive to external control. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to register UEs using new networking data responsive to external control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to register a User Equipment (UE), the method comprising:
   receiving, by an Application Function (AF), a UE instruction for the UE from an external application server and transferring, by the AF, the UE instruction to a Network Exposure Function (NEF);
   translating, by the NEF, the UE instruction received from the external application server into a registration cause for the UE and exposing, by the NEF, the registration cause to an Access and Mobility Management Function (AMF);
   generating, by the AMF, a network message that indicates the registration cause for the UE;
   transferring, by the AMF, the network message that indicates the registration cause for delivery to the UE;
   receiving, by the AMF, a registration request transferred by the UE that indicates the registration cause, wherein the UE generates and transfers the registration request in response to receiving the network message; and
   in response, registering, by the AMF, the UE to use a wireless communication network based on the registration cause.

2. The method of claim 1 wherein:
   the UE instruction indicates a registration technique; and
   registering, by the AMF, the UE to use the wireless communication network based on the registration cause comprising registering, by the AMF, the UE using the registration technique.

3. The method of claim 1 wherein:
   the UE instruction indicates a registration time; and
   registering, by the AMF, the UE to use the wireless communication network based on the registration cause comprising registering, by the AMF, the UE using at the registration time.

4. The method of claim 1 wherein transferring, by the AMF, the network message that indicates the registration cause for delivery to the UE comprises transferring, by the AMF, a deregistration instruction that indicates the registration cause for delivery to the UE.

5. The method of claim 1 wherein registering, by the AMF, the UE to use the wireless communication network comprises registering, by a new AMF, the UE to use the new AMF.

6. The method of claim 1 wherein registering, by the AMF, the UE to use the wireless communication network comprises registering, by the AMF, the UE to use a new wireless network slice.

7. The method of claim 1 wherein registering, by the AMF, the UE to use the wireless communication network comprises registering, by the AMF, the UE to use a new Dynamic Network Name (DNN).

8. The method of claim 1 wherein registering, by the AMF the UE to use the wireless communication network comprises registering, by the AMF, the UE to use a new frequency band.

9. The method of claim 1 wherein registering, by the AMF the UE to use the wireless communication network comprises registering, by the AMF, the UE to use a new access node.

10. The method of claim 1 wherein registering, by the AMF, the UE to use the wireless communication network comprises registering, by one of the AMF or a new AMF, the UE to use a new Public Land Mobile Network (PLMN).

11. The method of claim 1 wherein registering, by the AMF the UE to use the wireless communication network comprises rebooting the UE.

12. A system comprising:

an Application Function (AF), a Network Exposure Function (NEF), and an Access and Mobility Management Function (AMF);

the AF configured to:

receive a User Equipment (UE) instruction for a UE from an external application server; and transfer the UE instruction to the NEF;

the NEF configured to:

receive the UE instruction for the UE from the AF;

translate the UE instruction received from the external application server into a registration cause for the UE; and expose the registration cause to the AMF; and the AMF configured to:

generate a network message that indicates the registration cause for the UE;

transfer the network message that indicates the registration cause for delivery to the UE;

receive a registration request transferred by the UE that indicates the registration cause, wherein the UE generates and transfers the registration request in response to receiving the network message; and responsively register the UE to use a wireless communication network based on the registration cause.

13. The system of claim 12 wherein the AMF is further configured to register the UE to use a new wireless network slice based on the registration cause.

14. The system of claim 12 wherein the AMF is further configured to register the UE to use a new Dynamic Network Name (DNN) based on the registration cause.

15. The system of claim 12 wherein the AMF is further configured to register the UE to use a new frequency band based on the registration cause.

16. The system of claim 12 wherein the AMF is further configured to register the UE to use a new access node based on the registration cause.

17. The system of claim 12 wherein the AMF is further configured to register the UE to use a new Public Land Mobile Network (PLMN) based on the registration cause.

18. One or more non-transitory computer readable storage media having program instructions stored thereon, wherein the program instruction, when executed by a computing system, direct the computing system to perform operations, the operations comprising:

receiving, by an Application Function (AF), a User Equipment (UE) instruction for a UE from an external application server and transferring, by the AF, the UE instruction to a Network Exposure Function (NEF);

translating, by the NEF, the UE instruction received from the external application server into a registration cause for the UE and exposing, by the NEF, the registration cause to an Access and Mobility Management Function (AMF);

generating, by the AMF, a network message that indicates the registration cause for the UE;

transferring, by the AMF, the network message that indicates the registration cause for delivery to the UE;

receiving, by the AMF, a registration request transferred by the UE that indicates the registration cause, wherein the UE generates and transfers the registration request in response to receiving the network message; and in response, registering, by the AMF, the UE to use a wireless communication network based on the registration cause.

19. The non-transitory computer readable storage media of claim 18 wherein registering, by the AMF, the UE to use the wireless communication network based on the registration cause comprises registering, by one of the AMF of a new AMF, the UE to use one or more of the new AMF, a new wireless network slice, a new Dynamic Network Name (DNN), a new frequency band, a new access node, or a new Public Land Mobile Network (PLMN) based on the registration cause.

20. The non-transitory computer readable storage media of claim 18 wherein:

the UE instruction indicates a registration technique; and registering, by the AMF, the UE to use the wireless communication network based on the registration cause comprising registering, by the AMF, the UE using the registration technique.

* * * * *